(12) United States Patent
Walker et al.

(10) Patent No.: US 9,408,348 B2
(45) Date of Patent: Aug. 9, 2016

(54) ADJUSTABLE ROW UNIT DECK PLATE FOR A HEADER OF AN AGRICULTURAL HARVESTER

(71) Applicant: CNH America LLC, New Holland, PA (US)

(72) Inventors: Eric L. Walker, Leola, PA (US); Jason Earl Smith, State Center, IA (US); Michael Lee Berggren, Stockton, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/163,176

(22) Filed: Jan. 24, 2014

(65) Prior Publication Data

US 2015/0208580 A1     Jul. 30, 2015

(51) Int. Cl.
    *A01D 45/02*     (2006.01)

(52) U.S. Cl.
    CPC ............ *A01D 45/028* (2013.01); *A01D 45/021* (2013.01); *A01D 45/025* (2013.01)

(58) Field of Classification Search
    CPC .. A01D 45/021; A01D 45/025; A01D 43/082
    USPC .............................................. 56/119, 62, 107
    See application file for complete search history.

(56) References Cited

U.S. PATENT DOCUMENTS

| | | | | |
|---|---|---|---|---|
| 2,604,749 A | * | 7/1952 | Fergason | 56/103 |
| 2,618,113 A | * | 11/1952 | Hyman | 56/104 |
| 3,101,579 A | * | 8/1963 | Karlsson et al. | 56/105 |
| 3,126,690 A | * | 3/1964 | Becker | 56/107 |
| 3,262,255 A | | 7/1966 | Karlsson et al. | |
| 3,271,940 A | * | 9/1966 | Ashton et al. | 56/105 |
| 3,552,398 A | * | 1/1971 | Looker et al. | 460/130 |
| 3,707,833 A | | 1/1973 | Sutton | |
| 3,831,356 A | * | 8/1974 | Maiste et al. | 56/10.3 |
| 3,858,384 A | * | 1/1975 | Maiste et al. | 56/14.2 |
| 3,940,913 A | * | 3/1976 | Wallenfang et al. | 56/98 |
| 4,238,916 A | * | 12/1980 | Kesl et al. | 56/106 |
| RE31,064 E | * | 10/1982 | Shriver | 56/98 |
| 4,621,968 A | | 11/1986 | Hutchison | |
| 5,060,464 A | * | 10/1991 | Caron | 56/62 |
| 5,680,750 A | * | 10/1997 | Stefl | 56/62 |
| 5,878,559 A | * | 3/1999 | Cooksey et al. | 56/62 |
| 6,226,969 B1 | * | 5/2001 | Becker | 56/62 |
| 6,237,312 B1 | * | 5/2001 | Becker | 56/62 |
| 6,625,969 B2 | | 9/2003 | Glazik | |
| 7,073,316 B2 | | 7/2006 | Resing et al. | |
| 7,373,767 B2 | | 5/2008 | Calmer | |
| 8,171,708 B2 | | 5/2012 | Calmer | |
| 8,196,380 B2 | | 6/2012 | Carboni | |
| 8,224,534 B2 | * | 7/2012 | Kowalchuk | 701/50 |
| 8,267,240 B2 | | 9/2012 | Moreland et al. | |
| 2004/0016219 A1 | | 1/2004 | Calmer | |
| 2008/0092507 A1 | | 4/2008 | Bollig | |

(Continued)

*Primary Examiner* — Árpád Fábián-Kovács
(74) *Attorney, Agent, or Firm* — Patrick M. Sheldrake

(57) ABSTRACT

An adjustable row unit for a header of a combine harvester is disclosed. The row unit includes opposed and cooperating curved deck plates that reduce the distance from the upper surfaces of the deck plates to the stripping roll pinch points. The deck plates move in unison and the opening of the stalk receiving gap is variable and subject to coarse and fine adjustment. Coarse adjustment is achieved by moving the deck plates into a selected stalk receiving position and fine adjustment is performed by a yieldable biasing member when the deck plates are in the selected stalk receiving position.

8 Claims, 5 Drawing Sheets

(56) References Cited

U.S. PATENT DOCUMENTS

| | | | |
|---|---|---|---|
| 2011/0011048 A1* | 1/2011 | Hoffman | 56/119 |
| 2011/0146218 A1* | 6/2011 | Carboni | 56/62 |
| 2011/0173942 A1* | 7/2011 | Kowalchuk | 56/62 |
| 2012/0029757 A1 | 2/2012 | Kowalchuk | |
| 2014/0150394 A1* | 6/2014 | Calmer | 56/106 |

* cited by examiner

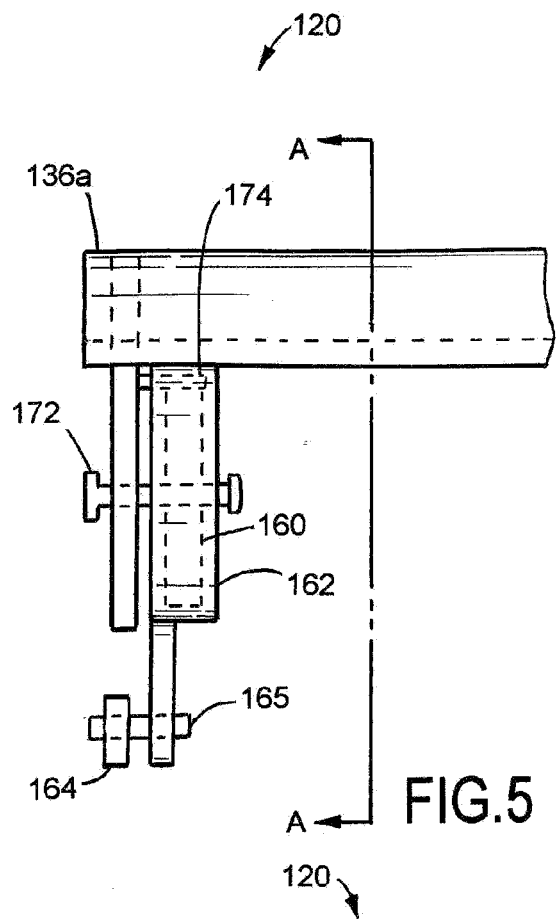
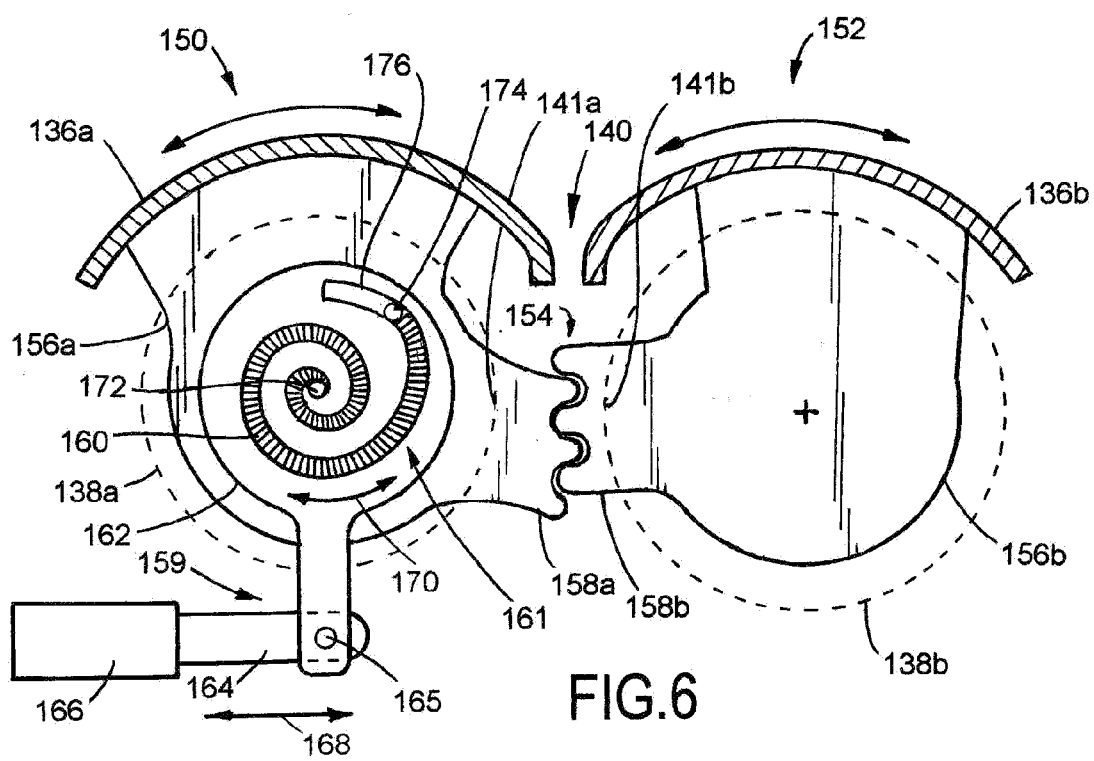

ADJUSTABLE ROW UNIT DECK PLATE FOR A HEADER OF AN AGRICULTURAL HARVESTER

BACKGROUND

The subject application relates generally to a header for use with agricultural harvesters. In particular, the subject application relates to an adjustable row unit deck plate for an agricultural harvester header.

The header of an agricultural harvester or combine is provided with row dividers and associated hoods for directing rows of corn stalks to downstream separation devices known as row units. The row units include stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger which conveys the harvested ears to a feederhouse of the combine. Harvested ears are then processed to the combine's inner chambers for downstream processing.

Row unit frames are typically constructed with forwardly projecting members that support several components of the row unit including the deck plates, the stalk roll support bearings, the front gathering chain idlers, the hoods and the row dividers. The deck plates are flat or planar with their shape being dictated by the geometry of the row unit frames. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The deck plates lie generally tangent to the upper surfaces of the stalk rolls and the stalk rolls engage the corn stalks at "pinch points" situated below the upper surfaces of deck plates. It has been observed that the greater the distance between the pinch points on the stalk rolls and the upper surfaces of the deck plates the greater the pulling force required to snap the corn ears from the stalks. In conventional headers e.g., corn headers, this pulling force often results in damage to the corn ears as they are stripped from the stalks. This phenomenon, known as "butt shelling," can destroy the ears or, at minimum, reduce the amount of kernels that can be effectively harvested from the ears.

Moreover, current corn headers are equipped with row units in which the gap between the deck plates, i.e., the width of the stalk receiving slot, is fixed. A problem with stalk receiving slots with fixed spacing is that butt shelling is apt to occur in stalks that are measurably smaller in diameter than the fixed width of the slot. Further, smaller ears may be pulled completely through the fixed spacing stalk receiving slots and go unharvested.

Accordingly, there is still a need for a row unit deck plate that addresses the foregoing issues of conventional header. Such needs are satisfied by the subject application.

BRIEF SUMMARY

In accordance with a first aspect, the subject application provides an adjustable row unit deck plate for a header for use with a combine harvester. The row unit includes a pair of curved deck plates having convex surfaces that are complementary in shape to the outer circumferential shape of the row unit's stalk stripping rolls. So constructed and arranged, the curved deck plates reduce the distance between the upper surfaces of the deck plates and stalk roll pinch points, and therefore reduces the likelihood of butt shelling. Advantages of row dividers constructed according to the subject application include less damage to the corn ears being harvested and improved harvest yield.

In accordance with a second aspect, the subject application provides an adjustable row unit deck plate assembly for a header for use with a combine harvester. The deck plate assembly includes a pair of deck plates and movement of one deck plate is dependent on the movement of the other deck plate. Further, the deck plates move toward and away from one another in unison. Accordingly, stalks are maintained centrally between the deck plates at all times thereby reducing asymmetrical lateral damage to the ears of corn being harvested.

In accordance with a third aspect, the subject application provides a row unit for a header having first and second deck plate assemblies. The first deck plate assembly includes a first body having a first gear, a first deck plate extending from the first body, and a biasing member operatively connected to the first body. The second deck plate assembly includes a second body having a second gear operatively engaged with the first gear, and a second deck plate extending from the second body and defining a stalk receiving gap with the first deck plate. The biasing member biases the first body to urge the first and second deck plates towards each other.

In accordance with a fourth aspect, the subject application provides a row unit for a header including a pair of opposing deck plate assemblies each having a curved deck plate defining a stalk receiving gap therebetween. The row unit further includes a movable control member operatively connected to at least one of the pair of opposing deck plate assemblies for rotating the at least one deck plate assembly into a selected position to adjust a width of the stalk receiving gap. A biasing member biases at least one of the pair of opposing deck plate assemblies for permitting movement of the at least one deck plate assembly between first and second positions and urging the opposing deck plates of the deck plate assemblies towards the first position.

In accordance with a fifth aspect, the subject application provides a deck plate assembly for a row unit of a header including a pair of opposing deck plates defining a stalk receiving gap, a coarse adjustment mechanism and a fine adjustment mechanism. The coarse adjustment mechanism moves the pair of opposing deck plates into a selected position to adjust the size of the stalk receiving gap. The fine adjustment mechanism allows the stalk receiving gap to expand and contract when the pair of opposing deck plates is in the selected position.

In accordance with a sixth aspect, the subject application provides a row unit for a header including a pair of opposing curved deck plates defining a stalk receiving gap. The row unit further includes a gear assembly operatively connected to the pair of opposing curved deck plates for moving at least one of the curved deck plates to adjust a size of the stalk receiving gap. The gear assembly includes gears to move the at least one curved deck plate into a selected position and permit movement of the at least one curved deck plate between first and second positions while the gear is at the selected gear position. At least one biasing member is operably connected to the at least one curved deck plate for urging the curved deck plate into engagement with stalks of varying thicknesses when the at least one curved deck plate is in the selected position.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings:

FIG. 5 is a partial side elevation view of a row unit for a corn header assembly according to the subject application with certain elements omitted for clarity of illustration; and FIG. 6 is a view of the row unit of FIG. 5 from section A-A thereof with certain elements shown in phantom line for clarity of illustration.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
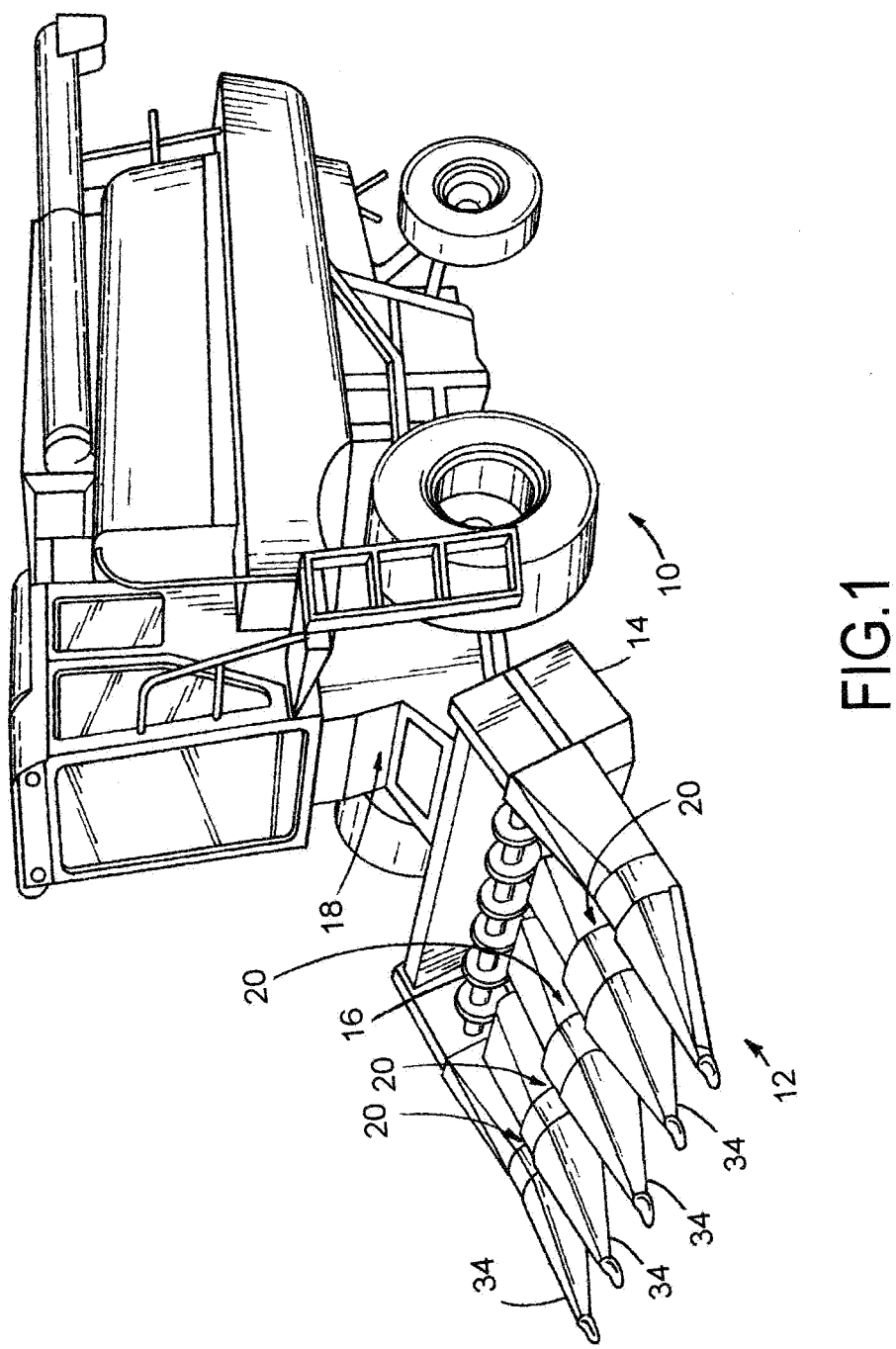
FIG. 1 is a perspective view of an agricultural combine including a conventional corn header assembly.

Referring now to the drawings, wherein aspects of the subject application are shown, FIG. 1 illustrates an agricultural harvester such as a combine 10 including a corn header assembly or corn header 12. The corn header 12 is shown to be operatively connected to the agricultural harvester 10 for harvesting e.g., corn and feeding the corn to a feederhouse for receiving crop residue, cutting, chopping and propelling the residue rearwardly and outwardly from the agricultural harvester 10 while retaining the valuable corn ears and kernels. Such feederhouses and harvesting operations are known in the art and a further detailed description of their structure, function and operation is not necessary for a complete understanding of the present invention. Alternatively, the corn header 12 can be connected to any device that may have use for a corn header.

Figure 2:
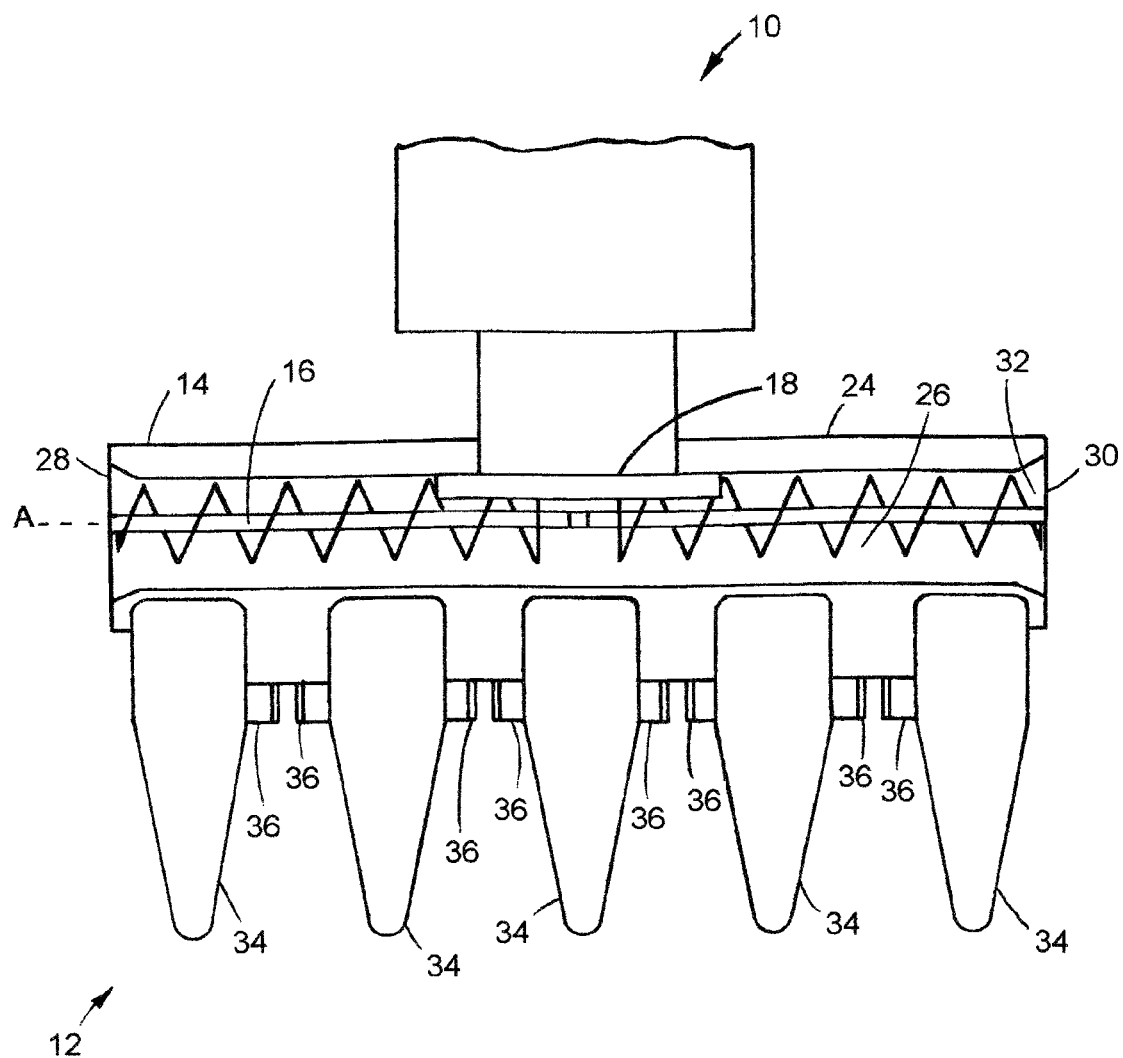
FIG. 2 is a top plan view of the corn header assembly of FIG. 1.

Referring to FIGS. 1 and 2, the corn header 12 includes a frame 14 for mounting to a forward end of the agricultural harvester 10, a conveyor 16 (such as an auger) extending lengthwise across the frame 14 for conveying crop material to a combine feeding location or feederhouse 18, and a plurality of row units 20 extending forwardly from the frame 14. The frame 14 is preferably configured as a substantially rectangular frame, as shown. However, the frame 14 can be configured as any shape suitable for the foregoing intended use. As seen in FIG. 2, the frame 14 includes a rear wall 24, a bottom wall 26 and a pair of side walls 28, 30. The frame 14 further includes a channel 32 formed partially by the bottom wall 26.

The conveyor 16 conveys harvested corn along the channel 32 to the combine feeding location 18 located adjacent a midpoint of the channel 32.

The conveyor 16 can be a screw auger conveyor, but can alternatively be any conveyor capable of moving grain through the channel 32, such as a paddle system, a conveyor belt, a pressure based system, or any combination thereof. Such conveyors are known in the art and a further detailed description of their structure, function and operation is not necessary for a complete understanding of the present invention. However, typical augers applicable to the present invention are disclosed in U.S. Pat. Nos. 8,267,240 and 4,621,968, the entire disclosures of which are incorporated by reference herein.

The auger 16 is connected to the frame 14 at the side walls 28, 30 and rotates about axis A. The half of the auger 16 that is closest to side wall 28 moves the harvested crop towards the opposite side wall 30 and the half of the auger 16 that is closest to side wall 30 moves the harvested crop towards the opposite side wall 28. The auger 16 is positioned in front or above the combine feeding location 18 and, as the auger 16 rotates, harvested grain moves towards the center of the auger 16 for feeding the harvested grain into the combine feeding location 18.

Figure 4:
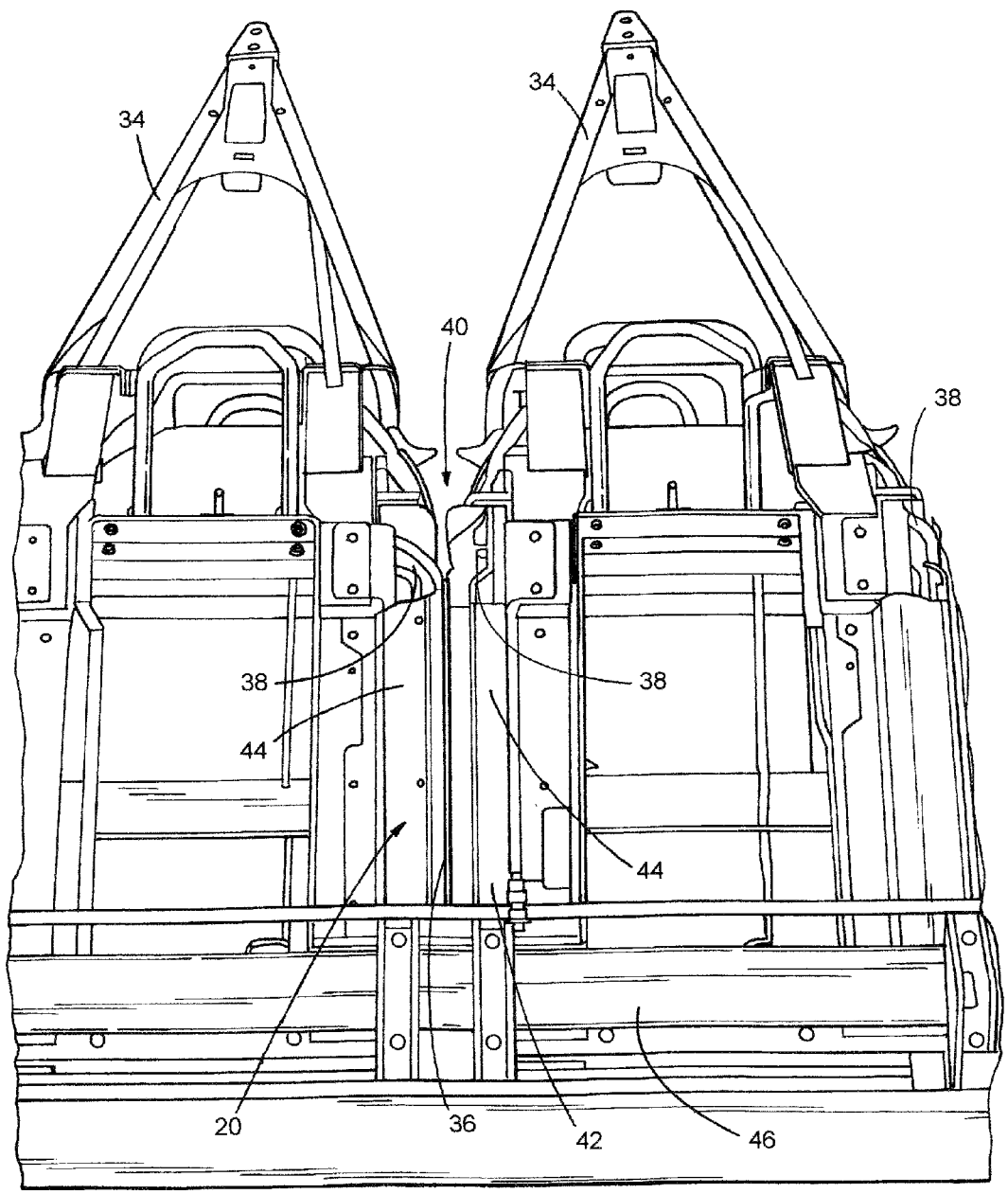
FIG. 4 is an enlarged partial bottom view of the corn head assembly of FIG. 1.

Referring still to FIGS. 1 and 2, the corn header 10 further includes a plurality of row dividers 34. The row dividers 34 extend forwardly from the frame 14 and are connected to extend across a pair of adjacent row units 20 (FIG. 1). Such dividers 34 are known in the art and a further detailed description of their structure, function and operation is not necessary for a complete understanding of the present invention. However, typical dividers applicable to the present invention are disclosed in U.S. Pat. Nos. 6,625,969 and 7,073,316, the entire disclosures of which are incorporated by reference herein. The dividers 34 extend forwardly from the frame 14 and are connected to the plurality of row units 20 for directing a row of corn stalks towards stripping plates 36 (also commonly known as a deck plates) of the row units (FIG. 2). That is, during harvesting operations, the row dividers 34 direct a row of corn stalk towards deck plates 36 and snapping rolls 38 (also commonly known as stalk stripping rolls) situated between adjacent row dividers (FIG. 4). The deck plates 36 and stalk stripping rolls 38 define a slot or gap 40 for receiving corn stalks and, as is known, the stalk rolls pull the stalk downwardly snapping the corn ear when it strikes the deck plates. The stalk stripping rolls desirably pull most of the crop residue down and out of the header.

As shown in FIG. 4, each row unit 20 includes a row unit frame 42 having a pair of row unit arms 44 connected by a breast plate 46 located about the rear of the row unit 20. As most clearly seen in FIG. 3, mounted lengthwise on each row unit arm 44 is a gathering chain 48 that directs corn stalks to the rear of the row unit 20 for the removal of corn ears from the stalks by the deck plates 36. In operation, crop material is stripped from the stalk and then travels across the breast plate 46 to the channel 32. The crop material stripped from the stalk is propelled rearwardly to the channel 32 due to the continuous flow of harvested crop material flowing rearwardly as a result of actions of the gathering chain 48.

Figure 3:
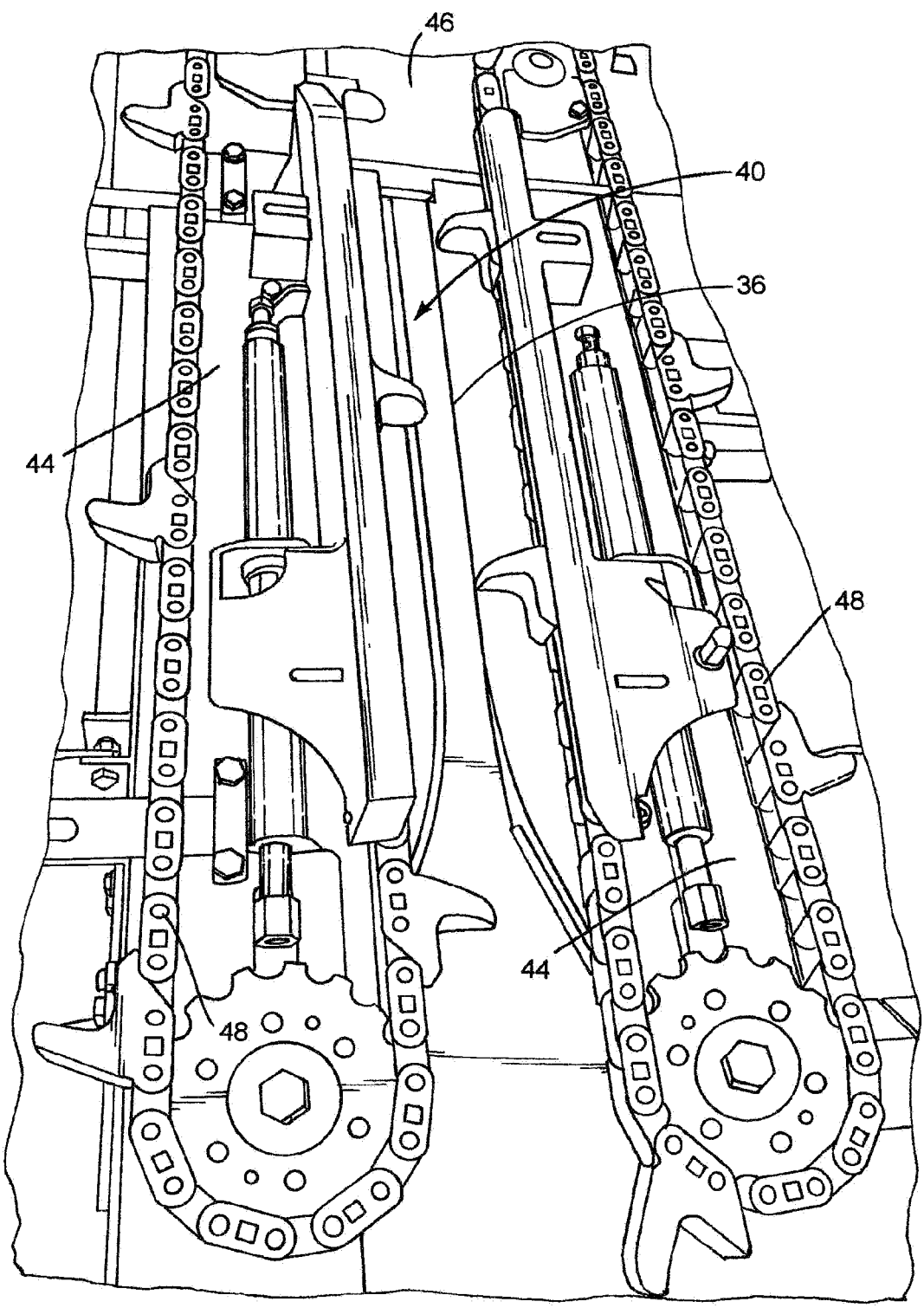
FIG. 3 is an enlarged partial perspective view of a row unit of the corn header assembly of FIG. 1.

A shortcoming of the arrangement shown in FIGS. 3 and 4 is that, by virtue of the deck plates being planar, there is a substantial distance between the upper surfaces of the deck plates which contact the corn ears being harvested and the pinch points of the stalk stripping rolls 38. As noted above, the greater this distance, the more force is required to snap a corn ear from the captured stalk and the greater the likelihood that the ear will experience some level of butt shelling.

Referring to FIGS. 5 and 6, there is shown a row unit 120 constructed in accordance with an aspect of the subject application. Similar to row unit 20 of FIGS. 1-4, row unit 120 includes a pair of first and second opposing deck plates 136a, 136b which define a stalk receiving slot or gap 140 for receiving corn stalks in the manner similar to that described above in connection with gap 40 of row unit 20. Row unit 120 further includes a gear assembly 154 operatively connected to the pair of opposing deck plates for moving the curved deck plates to adjust a size of the stalk receiving gap, and stalk stripping rolls 138a, 138b (shown in phantom lines in FIG. 6) associated with each one of the opposing deck plates 136a, 136b. In particular, the stalk stripping rolls 138a, 138b are situated beneath the first and second deck plates 136a, 136b, respectively. The stalk stripping rolls 138a, 138b are similar in structure and function to stalk stripping rolls 38 discussed above.

The gear assembly 154 includes gears 158a, 158b configured e.g., as shown in FIG. 6 to move the curved deck plates into a selected position and permit movement of the curved deck plates between first and second positions corresponding to wider or narrower gap positions while the gear assembly is at the selected gear position. For example, each gear 158a, 158b extends in a medial direction of the pair of opposing curved deck plates and intermesh. Thus, gears 158a, 158b are operable to rotate the pair of opposing curved deck plates in unison. In other words, the gear assembly 154 is operatively connected to the pair of opposing curved deck plates 136a, 136b for moving the deck plates to adjust a size of the stalk receiving gap.

Further, at least one biasing member 160 is operably connected to at least one curved deck plate for urging the curved deck plate into engagement with stalks of varying thicknesses when the at least one deck plate is in the selected position and the deck plates are biased outwardly by stalk, as further described below. That is, owing to the biasing member, the pair of opposing curved deck plates is configured to allow the deck plates to widen so as to receive stalk having a width greater than a width of the stalk receiving gap when the gear assembly is at a selected position. In such instances, the biasing member 160 applies a bias to the at least one curved deck plate for urging the deck plates to continuously engage the stalk regardless of its width or varying width of a plurality of stalks passing through the stalk receiving gap.

The biasing member 160 is housed within a carrier housing 162, as shown in FIG. 6. The biasing member 160 also includes a first end connected to a pivot pin 172 and a second end connected to a control pin 174. The pivot pin 172 has a rear end pivotally connected to a body portion 156a of the row unit and a forward end fixedly connected to the first end of the biasing member. The forward end of the pivot pin is also fixedly connected to the carrier housing. So constructed, the biasing member 160 is held fast to the pivot pin 172 such that when the biasing member carrier housing/pivot pin assembly rotates responsive to movement of a control member 164 (further discussed below), stress on the biasing member is either increased or decreased thus transferring force to the opposite end of the biasing member and the control pin 174. The control pin 174 being indirectly affixed to the curved deck plate 136a (as discussed below) transfers force from the biasing member 160 to the curved deck plate.

Further, the pair of opposing deck plates 136a, 136b, rather than being planar deck plates such as those provided in row unit 20, are curved in shape defining convex stalk engaging surfaces e.g., a curved deck plate, that are complementary in shape to the overall outer circumferential shapes of the stalk stripping rolls 138a, 138b. As a result, they have opposed inner ends that extend more closely positioned to the pinch points 141a, 141b of the stalk stripping rolls 138a, 138b than in conventional corn header apparatus equipped with planar deck plates. Consequently, since less distance exists between the upper surfaces of the deck plates 136a, 136b and the stalk roll pinch points 141a, 141b, less force is required to snap a corn ear from a stalk thereby reducing the possibility of butt shelling of the corn ears.

Furthermore, as shown in FIG. 6, the curvature of the curved deck plates 136a, 136b closely follows the circumferential contour of the stalk stripping rolls 138a, 138b. That is, for example, each deck plate and respective stalk stripping roll share a common longitudinal axis. Plus, each deck plate is formed to have a radius that, although slightly greater, substantially matches the radius of the stalk stripping rolls. So constructed and arranged, the radial distance between the curved deck plates and stalk stripping rolls is minimized thereby reducing the force necessary to strip a corn ear from a stalk regardless of either the angular orientation of the deck plates 136a, 136b relative to the stalk stripping rolls 138a, 138b or the width of the stalk receiving gap 140.

Alternatively expressed and referring again to FIGS. 5 and 6, row unit 120 includes a pair of opposing deck plate assemblies 150, 152 (e.g., first and second deck plate assemblies) each having a curved deck plate (e.g., opposing curved deck plates) defining a stalk receiving gap therebetween, a moveable control member 164 and a biasing member 160. The row unit further includes a gear assembly or gear mechanism 154 operatively connected to the pair of opposing curved deck plate assemblies, and by extension, the curved deck plates 136a, 136b to rotate the pair of opposing curved deck plates in unison responsive to movement of the control member 164 and adjust the size of the stalk receiving gap 140. That is, gear assembly 154 operatively connects the pair of opposing curved deck plates 136a, 136b and is operable to rotate the pair of opposing curved deck plates in unison responsive to movement of the control member 164.

The gear assembly 154 includes a first body 156a having a first gear 158a extending from the first body and connected to the first deck plate 136a. The first body 156a can be configured as shown e.g., in FIG. 6 as a substantially planar body with the first deck plate 136a extending from the first body in a substantially perpendicular manner. The first gear 158a extends in a medial direction of the pair of opposing deck plates in a manner substantially co-planar with the first body. The gear assembly 154 further includes a second body 156b having a second gear 158b extending from the second body and connected to the second deck plate 136b. The second body 156b can be configured as shown e.g., in FIG. 6 as a substantially planar body with the second deck plate 136b extending from the second body in a substantially perpendicular manner. The second gear 158b extends in a medial direction of the pair of opposing deck plates in a manner substantially co-planar with the second body so as to intermesh with the gears of the first gear 158a.

The movable control rod or control member 164 is configured e.g., as shown in FIG. 6 and operatively connected to at least one of the pair of opposing deck plate assemblies 150, 152 for rotating at least one of the deck plate assemblies into a selected position to adjust a width of the stalk receiving gap i.e., an initial base position of the stalk receiving gap. Additionally, the row unit includes the aforementioned biasing member 160 for biasing at least one of the pair of opposing deck plate assemblies for permitting movement of at least one deck plate assembly between first and second positions when the control member 164 is fixed in a predetermined position and urging the opposing deck plate assemblies toward the first position e.g., the initial base position of the stalk receiving gap.

Control member 164 operates the gear assembly 154 and is pivotably connected to carrier housing 162 at pivot joint 165. Control member 164 can be directly or indirectly connected to an extensible actuator 166 such as a hydraulic cylinder, pneumatic cylinder, screw jack or the like, in order to move the control member e.g., from left to right and right to left as indicated by arrow 168 which, in turn, causes movement of the biasing member carrier housing 162 between a first position and a second position in the clockwise and counterclockwise directions indicated by arrow 170. Alternatively, the control member can be an extensible actuator 166. The resulting movement of the carrier housing 162 by the control member causes the gear assembly 154 to rotate, which in turn modifies the stalk receiving gap.

The row unit can further be alternatively expressed as including a first deck plate assembly 150 and a second deck plate assembly 152. The first deck plate assembly 150 includes first body or crank plate 156a having first gear 158a and first deck plate 136a. As shown in FIG. 6 the first gear 158a extends from the first body in a medial direction of the row unit. First deck plate 136a extends from the first body 156a e.g., in a direction substantially parallel to a longitudinal axis of stalk stripping roller 138a.

Similarly, the second deck plate assembly 152 includes second body or crank plate 156b having second gear 158b operatively engaged with the first gear. As shown in FIG. 6 the second gear 158b extends from the second body in a medial direction of the row unit for engaging with the first gear 158a. Second deck plate 136b extends from the second body 156b e.g., in a direction substantially parallel to a longitudinal axis of stalk stripping roller 138b and defines a stalk receiving gap with the first deck plate 136a.

The first deck plate assembly 150 further includes biasing member 160 operatively connected to the first body, biasing member carrier housing 162 for housing the biasing member 160, and control member 164 for moving the carrier housing between a first position and a second position. The biasing member 160 is operatively connected to the first body 156a (as discussed above) for biasing the first body to urge the first and second deck plates 136a, 136b towards each other. The biasing member 160 further biases the first body to move relative to the carrier housing to urge the first and second deck plates towards each other, as further described below. In the example of FIG. 6, the biasing member is illustrated as a clock spring, but it will be appreciated that the biasing member 160 can assume any form suitable for its intended purpose, for example, a torsion spring, a compression spring, a tension spring, an elastomeric member or combinations thereof.

The biasing member carrier housing 162 is fixed to the pivot pin 172 and rotates with the pivot pin while the first body 156a is mounted to rotate about the pivot pin 172. Movement of the control pin 174 relative to the biasing member carrier housing 162 can be limited by a mechanical stop or other device. By way of example, this limiting device can be a slot or curved slot 176 provided in the biasing member carrier housing 162 through which the control pin projects. The curved slot 176 acts as a range limiter for limiting how much further the stalk receiving gap defined by the deck plates 136a, 136b can be widened by incoming stalk.

The control pin 174 and the first body 156a work against the curved slot 176 to set the selected stalk receiving opening (base position) between the deck plates 136a, 136b. The stalk receiving opening can be determined by a human operator or an intelligent automated control device (not illustrated) that controls operation of an extensible actuator 166. As shown, the biasing member 160 biases the control pin 174 against the inner or medial end of the curved slot 176 such that the biasing member normally holds the deck plates in a selected position that corresponds to a selected stalk receiving position having a selected stalk receiving gap. The outer or lateral end of the slot 176 acts as a stop to limit the maximum or second stalk opening position of the deck plates 136a, 136b such as when a large stalk is passed between the deck plates. Thus, increasingly larger diameter stalks will tend to open the deck plate gap wider thereby moving the control pin from the inner end of the slot 176 toward the outer end thereof.

The first body and the second body of the first and second deck plate assemblies are generally situated behind the stalk rollers 138a, 138b. When the carrier housing is associated with the first body, the first body 156a is moveable relative to the carrier housing 162 and the biasing member 160 biases the first body to move relative to the carrier housing to urge the first and second plates 136a, 136b toward each other. Further, the biasing member carrier housing 162 and first body 156a are concentric about the common pivot pin 172. Both the first body 156a and the carrier housing 162 are free to rotate within the limits of the system. While illustrated with the carrier housing 162 associated with the first body, the carrier housing can alternatively be associated with the second body or the row unit configured with two carrier housings associated with both the first and second bodies, respectively.

The first and second gears 158a, 158b are configured as shown e.g., in FIG. 6 and operate to rotate the first and second bodies 156a, 156b thereby moving the first and second deck plates 136a, 136b between a first position and a second position. The gears 158a, 158b closely mesh with one another and operatively connect the first and second deck plates. The gears are also operable to move or rotate the deck plates 136a, 136b in unison between a first position and a second position upon movement or rotation of the first and second bodies 156a, 156b responsive to movement of control member 164. The control member 164 limits the movement (e.g., rotational movement) of the biasing member carrier housing 162 and subsequently the first body 156a. The cooperating movement of gears 158a, 158b of gear assembly 154 results in equal and opposite opening and closing of the deck plates 136a, 136b. Consequently, the first and second gears 158a, 158b maintain a symmetrical and centered slot or gap opening 140 with respect to the stalk rolls thereby reducing harmful lateral shifting of the stalks which could result in damage to the corn ears being harvested.

However, it is also contemplated that the gear assembly 154 can be eliminated and one of the first and second deck plate assemblies 150, 152 configured to be moveable while the other deck plate assembly remains stationary. For example, the first deck plate assembly 150 can be configured to be moveable toward and away from the stationary second deck plate assembly 152, or vice versa, via a biasing member, such as a spring.

Referring again to FIGS. 5 and 6, the subject application can also be alternatively expressed as disclosing a deck plate assembly for a row unit of a header that includes a pair of opposing deck plates defining a stalk receiving gap, a coarse adjustment mechanism 159 and a fine adjustment mechanism 161. The coarse adjustment mechanism is operable to move the pair of opposing deck plates 136a, 136b into a selected position or base position to adjust the size of the stalk receiving gap 140 and the fine adjustment mechanism 161 allows the stalk receiving gap to expand and contract when the pair of opposing deck plates is in the selected position.

The coarse adjustment mechanism includes the gear mechanism 154 (as discussed above) operatively engaging the pair of opposing deck plates 136a, 136b and the moveable control member 164 for operating the gear mechanism. More particularly, the coarse adjustment mechanism 159 includes the moveable control member 164 that can be operatively connected to at least one of the pair of opposing deck plates 136a, 136b for moving or rotating the at least one deck plate into a selected position to adjust a width of the stalk receiving gap 140. Thus, at least one of the deck plates is moveable into a selected position to adjust the base width of the stalk receiving gap via the gear mechanism 154 which operatively engages the pair of opposing deck plates.

The fine adjustment mechanism 161 includes the biasing member 160 for biasing and allowing movement of the pair of opposing deck plates when the control member 164 of the coarse adjustment mechanism is fixed in position. The biasing member 160 is operatively connected to the first body 156a to bias the first body to urge the first and second deck plates towards each other.

The fine adjustment mechanism 161 further includes carrier housing 162 for housing the biasing member. The carrier housing 162 is adjacent to the first body of the first deck plate, operatively connected to the first body 156a, and connected thereto by pin 172. Furthermore, the biasing member is operatively linked to and biases the pair of opposing deck plates 136a, 136b thereby allowing movement of the deck plates. As shown, the biasing member 160 biases the first body 156a to move relative to the carrier housing to urge the first and second deck plates 136a, 136b towards each other. Biasing member 160 also biases and allows movement of the pair of deck plates relative to the moveable control member 164. In other words, the biasing member 160 biases at least one of the pair of opposing deck plates, e.g., first deck plate 136a, for permitting movement of the first deck plate 136a between first and second fine adjustment positions when the deck plates encounter a separation force greater than the applied biasing force generated by biasing member 160. Further, the biasing member 160 urges the opposing deck plates into engagement with stalks of varying thicknesses when the deck plates are widened (via stalk) greater than the selected base position established by the coarse adjustment mechanism.

Now in combination with FIGS. 5 and 6, the operation of the subjection application will be described. As shown in the example of FIGS. 5 and 6, the row unit includes an adjustable pair of deck plates. To open the deck plate gap wider, the control member 164 is moved in the appropriate direction, e.g., from left to right in FIG. 6. Responsive to that motion, the biasing member carrier housing 162 rotates counterclockwise and the inner end of the slot 176 pushes against the control pin 174 in a counterclockwise direction. Such movement of control pin 174 results in counterclockwise movement of the first body 156a. When gear assembly 154 is present, the counterclockwise motion of first body 156a results in an equal and opposite clockwise movement of the second body 156b due to intermeshing of gears 158a, 158b whereby the deck plates 136a, 136b move together in unison to maintain a centered opening relative to the position of the stalk rolls. To narrow the stalk opening the control member is moved from right to left in FIG. 6. Whether widening or narrowing the stalk opening, the biasing member 160 will operate to hold the control pin 174 against the inner end of the slot 176 to bias the deck plate to the initial base position corresponding to the initial stalk receiving gap position.

The biasing member 160 thus biases the control pin 174 in the curved slot 176 towards the inner end of the slot so as to permit the crank plates to rotate outwardly (i.e., the first body rotating counterclockwise and the second body rotating clockwise when viewed as shown in FIG. 6) to accommodate for minor adjustments in stalk diameter. Minor adjustments are dependent on input from the crop being harvested. As a stalk with a larger diameter than the selected stalk receiving gap width enters the deck plate gap 140, the force of the stalk on the deck plates forces the deck plates to bias outwardly. This force is transmitted backwards through the first and second bodies 156a, 156b to the control pin 174, and ultimately into the biasing member 160. When the stalk exits the deck plates 136a, 136b, the biasing member 160 biases and returns the deck plates to its original predetermined position and gap width.

Should the deck plates 136a, 136b need to have a wider base gap the operator can manually open the deck plates via extensible member 166 to move the control member 164, e.g., left to right in FIG. 6, in order to move the inner end of the slot 176 against control pin 174 thereby pushing the first and second bodies 156a, 156b and their associated deck plates further apart. If the deck plate gap needs to be narrowed, the extensible member 166 can be operated to move the control member 164, e.g., right to left in FIG. 6, in order to move the slot 176 in a clockwise direction (as shown in FIG. 6) such that the biasing member can bias the first and second bodies and consequently the first and second deck plates to move closer together. In either case, the biasing member 160 continuously operates to bias the deck plates to rotate inwardly (when viewed as shown in FIG. 6) and press against the inner end of the slot 176.

It will be appreciated by those skilled in the art that changes could be made to the embodiments described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A row unit for a header comprising:
   a first deck plate assembly that includes:
      a first body having a first gear,
      a first deck plate extending from the first body, and
      a torsion spring operatively connected to the first body; and
   a second deck plate assembly that includes:
      a second body having a second gear operatively engaged with the first gear,
      a second deck plate extending from the second body and defining a stalk receiving gap with the first deck plate,
      wherein the torsion spring biases the first body to urge the first and second deck plates towards each other;
      wherein the torsion spring is housed within a carrier housing and includes a first end connected to a pivot pin and a second end connected to a control pin,
      the carrier housing rotatably movable relative to the first body,
      the pivot pin having a first end pivotally connected to a body portion of the row unit and a second end fixedly connected to the first end of the torsion spring,
   the second end of the pivot pin further being fixedly connected to the carrier housing,
      the control pin is indirectly affixed to the first deck plate.

2. The row unit of claim 1, wherein the first and second gears are operable to rotate the first and second body thereby moving the first and second deck plates between a first position and a second position.

3. The row unit of claim 1, wherein the torsion spring biases the first body to move relative to the carrier housing to urge the first and second deck plates toward each other.

4. The row unit of claim 1, wherein the first and second deck plates are curved deck plates.

5. A row unit for a header comprising:
- a pair of opposing curved deck plates defining a stalk receiving gap;
- a gear assembly operatively connected to the pair of opposing curved deck plates for moving the curved deck plates to adjust a size of the stalk receiving gap, the gear assembly including gears to move the curved deck plates into a selected position and permit movement of the curved deck plates between first and second positions while the gear assembly is at the selected gear position; and
- at least one spring operably connected to at least one curved deck plate for urging the curved deck plate into engagement with stalks of varying thicknesses when the at least one curved deck plate is in the selected position, wherein the spring is housed within a carrier housing and includes a first end connected to a pivot pin and a second end in connection with the first deck plate,
- the carrier housing movable relative to the first body,
- the pivot pin having a first end pivotally connected to a body portion of the row unit and a second end fixedly connected to the first end of the spring, the second end of the pivot in further being fixedly connected to the carrier housing.

6. The row unit of claim 5, wherein the gears are operable to rotate the pair of opposing curved deck plates in unison.

7. The row unit of claim 5, wherein the pair of opposing curved deck plates define convex stalk engaging surfaces.

8. The row unit of claim 5, further comprising a stalk stripping roll associated with each one of the opposing curved deck plates, and wherein each of the opposing curved deck plates has a convex surface that is complementary in shape to an outer circumferential shape of the stalk stripping roll.

* * * * *